(12) United States Patent
Bengtson

(10) Patent No.: US 6,778,988 B2
(45) Date of Patent: Aug. 17, 2004

(54) METHOD AND APPARATUS FOR DELIVERING A WEB PAGE TO A CLIENT DEVICE BASED ON PRINTED PUBLICATIONS AND PUBLISHER CONTROLLED LINKS

(75) Inventor: Michael B. Bengtson, Frankfort, IL (US)

(73) Assignee: R.R. Donnelley & Sons Company, Chicago, IL (US)

( * ) Notice: Subject to any disclaimer, the term of this patent is extended or adjusted under 35 U.S.C. 154(b) by 404 days.

(21) Appl. No.: 09/846,674

(22) Filed: May 1, 2001

(65) Prior Publication Data

US 2002/0049781 A1 Apr. 25, 2002

Related U.S. Application Data

(60) Provisional application No. 60/201,570, filed on May 1, 2000.

(51) Int. Cl.$^7$ .............................................. G06F 17/30
(52) U.S. Cl. .............................. 707/10; 707/9; 707/102
(58) Field of Search ......................... 707/10, 102, 100, 707/9; 715/513

(56) References Cited

U.S. PATENT DOCUMENTS

| | | | | |
|---|---|---|---|---|
| 5,751,961 A | | 5/1998 | Smyk | |
| 5,778,400 A | * | 7/1998 | Tateno | 715/513 |
| 5,797,008 A | * | 8/1998 | Burrows | 707/101 |
| 5,809,502 A | * | 9/1998 | Burrows | 707/7 |
| 5,812,999 A | * | 9/1998 | Tateno | 707/3 |
| 5,832,500 A | * | 11/1998 | Burrows | 707/103 R |
| 5,848,410 A | * | 12/1998 | Walls et al. | 707/4 |
| 6,397,218 B1 | * | 5/2002 | Stern et al. | 707/10 |
| 2001/0049687 A1 | | 12/2001 | Russell | |

FOREIGN PATENT DOCUMENTS

| | | |
|---|---|---|
| WO | WO-01/35279 A2 | 5/2001 |
| WO | WO-01/84378 A2 | 11/2001 |
| WO | WO-02/19170 A1 | 3/2002 |

OTHER PUBLICATIONS

Yuwono et al., Search and Ranking Algorithm for Locatiing Resources on the World Wide Web, IEEE Proceedings of the 12$^{th}$ Inter. Conf. on Data Engineering, Feb. 1996, pp. 164–171.*

Lee et al., Object–Oriented Modeling, Querying, and Indexing for Multi–Structured Hypermedia Document Database, IEEE Proceedings of Inter. Workshop on Multimedia DBMS, Aug. 1996, pp. 133–140.*

Maudlin, Lycos: Design Choices in an Internet Search Service, IEEE Expert, Jan 1997, vol. 12 issue 1, pp. 8–11.*

* cited by examiner

Primary Examiner—Greta Robinson
(74) Attorney, Agent, or Firm—Grossman & Flight, LLC

(57) ABSTRACT

The system described herein generates a search index and a hyperlink database associated with a plurality of printed publications from different publishers. The search index includes a plurality of words and/or phrases from the printed publications. The search index is preferably based on print data received from the associated publisher. The hyperlink database logically associates publication hit specifications with network addresses. A publication hit specification identifies a portion of the print data. Preferably, the network address points to a web page. The hyperlink database is based on network addresses received from an administrator authorized by the publisher (e.g., a person given a password by the content creator and/or copyright owner). Subsequently, the system is able to direct client devices to specific web pages in response to search queries received from client devices by correlating the received queries to network addresses using the search index and the hyperlink database.

40 Claims, 7 Drawing Sheets

PUBLICATION LINKS

| Publication Hit Specification | Network Address |
|---|---|
| TYPE: Book<br>ISBN: 293857283<br>TITLE: Saltwater Fishing<br>PAGE: 23<br>WORDS: "Big Eye Tuna" | www.SportFishWorld.com/Tuna |
| TYPE: Magazine<br>Issue: 1<br>Date: 4/16/2001<br>Title: Fishing in the Keys<br>Page: 123 | www.floridakeysmag.com/<br>subscribers/enterpassword |

FIG. 7

METHOD AND APPARATUS FOR DELIVERING A WEB PAGE TO A CLIENT DEVICE BASED ON PRINTED PUBLICATIONS AND PUBLISHER CONTROLLED LINKS

RELATED APPLICATION

This application claims priority from U.S. Provisional Application Serial No. 60/201,570 filed May 1, 2000.

TECHNICAL FIELD

The present invention relates in general to searching for data available on the Internet and, in particular, to methods and apparatus for serving (i.e. delivering) a web page to a client device based on a printed publication.

BACKGROUND

A person reading a printed publication, such as a book or magazine article, may want more information on a particular topic. Typically, people who want to find information on the Internet use a search engine. A search engine allows a user to do a key word search for web pages containing information of interest. However, such searching is often frustrating. After a long list of potential web sites is compiled by the search engine, the searcher must wander from page to page manually searching for information. This process is time consuming. In addition, traditional web searches do not include a search of printed publications.

Often, people reading a printed publication are directed to a particular web page where more information specifically selected by the author or the publisher can be found. One way to accomplish this is to print a Uniform Resource Locator (URL) in the printed publication (e.g., www.publisher.com/booktitle/moreinfo). Another mechanism for directing a reader to a web page is to print a barcode in the printed publication. The reader then scans the barcode, and associated software directs a connected computer to the appropriate web page. However, placing a large number of URL's and/or barcodes in a printed publication is distracting to the reader and consumes space in the printed publication otherwise reserved for content. In addition, typing long URL's is cumbersome, and many people do not have a barcode reader connected to their computer.

SUMMARY OF THE INVENTION

In accordance with one aspect of the invention, a method of delivering a web page to a client device is provided. The method comprises the step of receiving first print data from a first publisher and second print data from a second publisher. The first print data is indicative a first printed publication, and the second print data is indicative of a second printed publication. The first print data is different than the second print data, and the first publisher is different than the second publisher. The method further comprises the step of generating a search index from the first print data and the second print data. The search index facilitates full-text searching of the first print data and the second print data. Still further, the method comprises the step of receiving a first plurality of publication links from a first link administrator authorized by the first publisher. Each of the first plurality of publication links associates each of a first plurality of publication hit specifications with each of a first plurality of network addresses. Each of the first plurality of publication hit specifications identifies a portion of the first print data. Similarly, the method comprises the step of receiving a second plurality of publication links from a second link administrator authorized by the second publisher. Each of the second plurality of publication links associates each of a second plurality of publication hit specifications with each of a second plurality of network addresses. Each of the second plurality of publication hit specifications identifies a portion of the second print data. The first plurality of publication links are different than the second plurality of publication links. Preferably, the first link administrator lacks authorization to submit publication links associating a publication hit specification from the second plurality of publication hit specifications with any network address. Similarly, the second link administrator preferably lacks authorization to submit publication links associating a publication hit specification from the first plurality of publication hit specifications with any network address. The method further comprises the steps of receiving a search query from the client device via a network, and correlating the query to at least one publication hit specification contained in the first plurality of publication hit specifications and the second plurality of publication hit specifications based on the search index. Still further, the method comprises the step of determining a target network address contained in the first plurality of network addresses. The target network address is associated with at least one publication hit specification by the first plurality of publication links. In addition, the method comprises the step of transmitting data related to the target network address to the client device via the network.

In one embodiment, the step of receiving a search query from the client device comprises the step of receiving a digital image. In some embodiments, the step of receiving a search query from the client device comprises the step of receiving text derived from a digital image.

In accordance with another aspect of the invention, a method of serving a web page to a client device based on a printed publication is provided. The method comprises the step of generating a search index from print data. Preferably, the print data are indicative of the printed publication, and the search index logically associates each of a plurality of words and/or phrases in the printed publication with one or more page numbers on which each such word or phrase occurs in the printed publication. The method further comprises the step of receiving a plurality of page number links from an authorized publisher. Preferably, each page number link logically associates a particular page in the printed publication with a network address. Still further, the method comprises the step of receiving a publication query from the client device via a network. The publication query may include a publication identifier and a search term. In addition, the method comprises the step of correlating the publication query to a target page number of the printed publication based on the search index. The method further comprises the steps of retrieving a target network address from the plurality of page number links based on the target page number and transmitting data related to the target network address to the client device via a network.

In one embodiment, the step of generating a search index from print data comprises the step of generating the search index from the print data during a printing process associated with the printed publication. In another embodiment, the step of generating a search index from print data comprises the steps of optically scanning the printed publication to produce a plurality of digitized pages and performing a character recognition process on the digitized pages. In one embodiment, the step of generating a search index from print data comprises the step of selecting a word to include in the plurality of words based on a visual indicator associated with the word. In such an instance, the step of selecting a word to include in the plurality of words may comprise the step of selecting the word based on at least one of a font type, a font style, a font size, a graphic indicator, an icon, and a border associated with the word.

In yet another embodiment, the step of storing a plurality of page number links comprises the step of storing a chapter link. In such an instance, the chapter link preferably logically associates a group of consecutive pages in the printed publication with a network address. The chapter link is preferably stored at a lower order of precedence than a specific page number link. Similarly, the step of storing a plurality of page number links may comprise the step of storing a publication title link. In such an instance, the publication title link preferably logically associates all of the pages in the printed publication with a network address. The publication title link is preferably stored at a lower order of precedence than any chapter link(s). Still further, the step of storing a plurality of page number links may comprise the step of storing a publisher link. In such an instance, the publisher link preferably logically associates all the pages in a first printed publication and all the pages in a second printed publication with a network address. The publisher link is preferably stored at a lower order of precedence than any publication title link(s).

In one embodiment, the step of receiving a publication query from the client device comprises the step of receiving at least one of a publication title, a page number, a registered phrase, and a foreign language indicator. In one embodiment, the step of transmitting data related to the target network address comprises the step of transmitting at least one of a redirection message, web page data, hyperlink data, and a digital version of a second printed publication.

In accordance with yet another aspect of the invention, an apparatus for serving a web page to a client device based on a printed publication is provided. The apparatus comprises a memory device storing a search index generated from print data used during a printing process associated with the printed publication. The print data are preferably indicative of the printed publication. The memory device also stores a plurality of links. Each link preferably logically associates an index entry from the search index with a network address. The apparatus also comprises a network receiver structured to receive a query from the client device via a network and a network transmitter structured to transmit data related to the target network address to the client device via the network. Still further, the apparatus comprises a controller operatively coupled to the memory device, the network receiver, and the network transmitter. The controller is preferably structured to correlate the query to the target network address based on the search index and the plurality of links. The controller is also preferably structured to cause the network transmitter to transmit the data related to the target network address to the client device via the network in response to the query.

In one embodiment, the apparatus further comprises an optical scanner structured to convert the printed publication into a bit map and an optical character recognition system structured to convert the bit map into the print data.

BRIEF DESCRIPTION OF THE DRAWINGS

Features and advantages of the disclosed system will be apparent to those of ordinary skill in the art in view of the detailed description of exemplary embodiments which is made with reference to the drawings, a brief description of which is provided below.

FIG. 7 is a table illustrating two exemplary publication links including publication hit specifications and associated network addresses.

DETAILED DESCRIPTION OF THE PREFERRED EMBODIMENTS

In general, the system described herein generates a search index and a hyperlink database associated with a plurality of printed publications from different publishers. The search index includes a plurality of words and/or phrases from the printed publications. The search index is preferably based on print data received from the associated publisher. The hyperlink database logically associates publication hit specifications with network addresses. A publication hit specification identifies a portion of the print data. For example, a publication hit specification may be a data record identifying a book by International Serial Book Number (ISBN), one or more pages in the book by page number, and one or more words in the book by the text of the word(s). Preferably, the network address points to a web page. The hyperlink database is based on network addresses received from an administrator authorized by the publisher (e.g., a person given a password by the content creator and/or copyright owner). Subsequently, the system is able to direct client devices to specific web pages in response to search queries received from client devices by correlating the received queries to network addresses using the search index and the hyperlink database.

Figure 1:
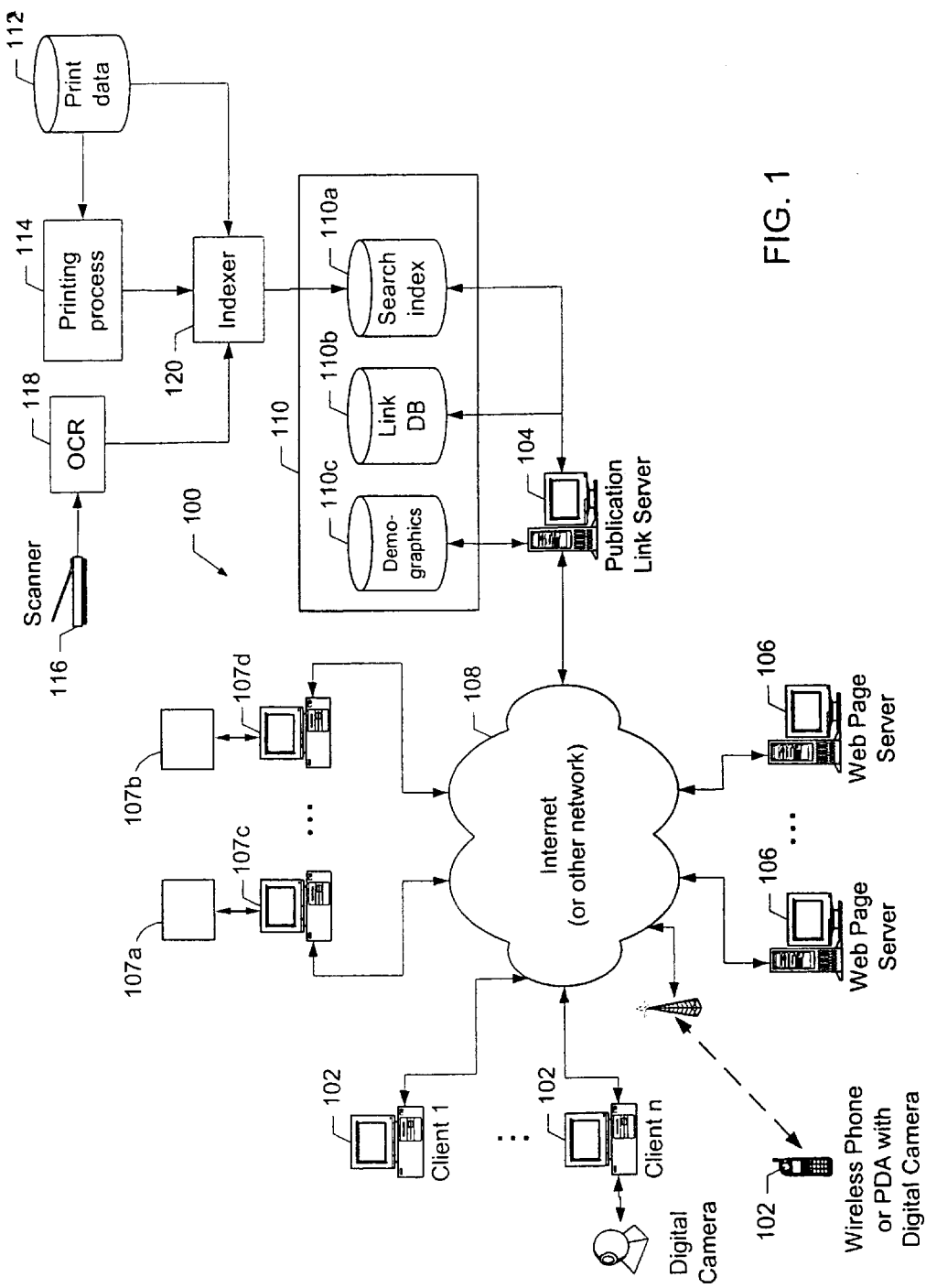
FIG. 1 is a high level block diagram of a communications system illustrating an exemplary environment of use for the present invention.

A high level block diagram of an exemplary communications system 100 capable of employing the teachings of the present invention is illustrated in FIG. 1. Typically, the system 100 includes one or more client devices 102, one or more publication link servers 104, one or more web page servers 106, one or more publisher servers 107a, 107b, and an indexer 120. Each of these devices may communicate with each other via a connection to the Internet or some other wide area network 108. Each of the publisher servers 107a and 107b is associated to a link administrator. For example, the publisher server 107a is associated to a first link administrator 107c and the publisher server 107b is associated to a second link administrator 107d.

Typically, a publication link server 104 stores a plurality of files, programs, and/or web pages for use by the client devices 102. One publication link server 104 may handle requests from a large number of clients 102. Accordingly, the publication link server 104 is typically a high end computer with a large storage capacity, one or more fast microprocessors, and one or more high-speed network connections. Conversely, relative to a typical server 104, each client device 102 typically includes less storage capacity, a single microprocessor, and a single network connection.

One or more SQL servers 110 are preferably in communication with the publication link server 104. Preferably, the SQL server 110 includes at least a search index 110a, a link database 110b, and a demographics database 110c. The search index 110a includes a plurality of words and/or phrases from a printed publication. As used herein, the term "printed publication" refers to any type of printed publication, such as a book, magazine, brochure, pamphlet, etc . . . The indexed words and/or phrases are preferably associated logically with one or more page numbers on which the words and/or phrases occur in the printed publication. The search index 110a is preferably generated by the indexer 120 from print data 112. Print data 112 are data indicative of the printed publication. For example, the print data 112 may be data used during a printing process 114 associated with the publication. In this manner, some or all of the search index 110a may be generated automatically during the printing process 114. However, a person of ordinary skill in the art will readily appreciate that the search index 110a may be generated before and/or after the print data 112 is used to generate the printed publication. Similarly, any type of computer readable media and/or network may be used to transfer the print data 112 to the indexer 120 with or without an associated printing process 114. Alternatively, existing publications may be digitized by an optical scanner 116 and processed by an optical character recognition process 118 in a well-known manner. This alternative is especially useful for publications which are out of print.

Words and phrases extracted from the print data 112 may be selected based on any well-known indexing criteria. For example, certain predetermined keywords may be selected. Preferably, all words in each publication are indexed. However, certain high frequency words such as "is", "and", "but", "or", "the", "a", etc. may be omitted from the index. In one embodiment, key phrases in the print data 112 are indicated by one or more tags. The tag(s) may cause a visual indication to be associated with the phrase when the publication is printed. In addition, the tag(s) may be used to flag the word or phrase to indicate that the word or phrase should be included in the search index 110a. For example, one or more attributes (such as a font attribute, a graphic attribute, and/or an invisible attribute) may be established for each phrase or word in the search index 110a. Font attributes include, but are not limited to, font type (e.g., Arial, Courier, Times, etc . . . ), font style (e.g., italics, reverse italics, bold underlined, etc . . . ), and/or font size (e.g., 10 point, 12 point, etc . . . ). Graphic attributes include, but are not limited to, icons, symbols, pictures, and/or borders. For example, the phrase may be placed in a border or near an icon. Invisible attributes may be any type of well-known embedded code such as a meta-tag. By using visible attributes, such as font attributes and graphic attributes, a reader of the publication is visually informed that the highlighted phrase may be used as a "publication link" as described in detail below. In one embodiment, the tags include Hypertext Markup Language (HTML) tags. For example, a Portable Document Format (PDF) file may explicitly include hyperlinks.

The link database 110b preferably includes a plurality of publication links (see FIG. 7). Each publication link logically associates one or more publication hit specifications with a network address, such as an Internet address (e.g., a URL). A publication hit specification identifies a portion of the print data. For example, a publication hit specification may be a data record identifying a book by International Serial Book Number (ISBN), one or more pages in the book by page number, and one or more words in the book by the text of the word(s). Of course, a person of ordinary skill in the art will readily appreciate that any data identifying any portion of any publication may be used in a publication hit specification. For example, publication types, publication titles, publications dates, etc . . . may be used. The network address may be any type of network address such as an Internet Protocol (IP) address. Preferably, the network address points to a web page located on a web page server 106. In addition to words and pages, other aspects of the printed publication may have associated network addresses. For example, one or more chapters of a book, the entire book, and/or the publisher of the book may have associated network addresses.

If more than one network address is logically associated with the same word or page, an order of precedence is established. Preferably, individual pages have a higher priority than chapters, which have a higher priority than books, which have a higher priority than publishers. For example, assume book A is logically associated with address A, chapter one of book A is logically associated with address B, page one of chapter one is logically associated with address C, and page two of chapter one is not individually associated with an address. A "hit" (described in detail below) on page one would direct the user to address C, but a hit on page two would direct the user to address B. Similarly, if a page in book A is not individually associated with an address, and the chapter the page is in is not logically associated with an address, then address A (the address logically associated with the whole book) is used for hits of that page. In this manner, the publisher is able to establish a link for every page of a printed publication, without the burden of establishing a large number of individual links. On the other hand, the publisher is able to create page specific links, if desired.

Figure 2:
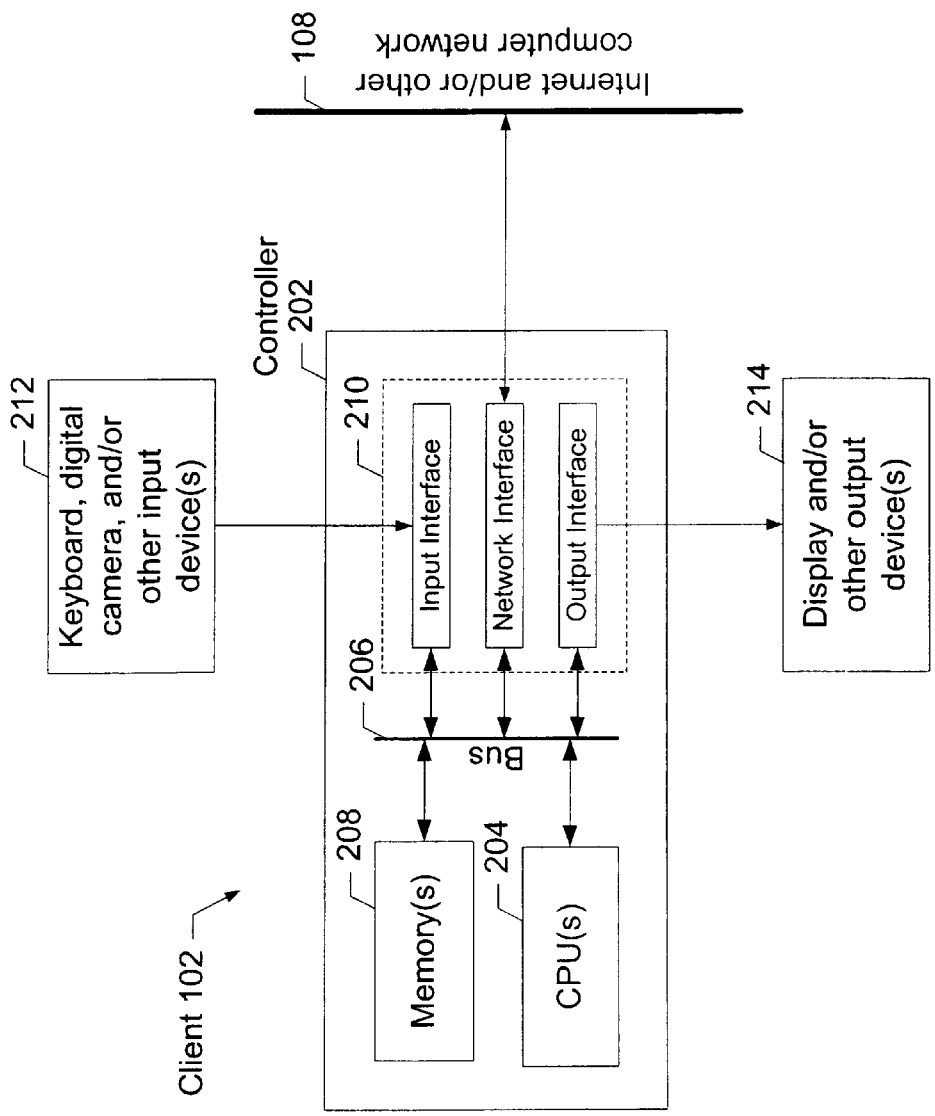
FIG. 2 is a more detailed block diagram of one of the client devices illustrated in FIG. 1.

A more detailed block diagram of a client device 102 is illustrated in FIG. 2. For the purpose of simplicity in discussion, a personal computer is used as an exemplary client device 102 throughout this description. However, a person of ordinary skill in the art will readily appreciate that any communication device may be used as a client 102. For example, a wireless telephone or a personal digital assistant (PDA) may be a client device 102. In one embodiment, a wireless telephone or PDA includes digital camera. In this embodiment the search query may be a digital image of a page.

The client 102 includes a controller 202 which preferably includes a central processing unit (CPU) 204 electrically coupled by an address/data bus 206 to a memory device 208 and one or more interface circuits 210. The CPU 204 may be any type of well-known CPU, such as an Intel Pentium™ processor. The memory device 208 preferably includes volatile memory and non-volatile memory. Preferably, the memory device 208 stores a software program that interacts with the publication link server 104 as described below. This program may be executed by the CPU 204 in a well-known manner. The memory device 208 may also store digital data indicative of documents, files, programs, web pages, etc . . . retrieved from the publication link server 104, and/or retrieved from a web page server 106, and/or loaded via an input device 212.

The interface circuits 210 may be implemented using any type of well-known interface standards, such as Ethernet and/or Universal Serial Bus (USB). One or more input devices 212 may be connected to one or more of the interface circuits 210 for entering data and commands into the controller 202. For example, the input device 212 may be a keyboard, digital camera, mouse, touch screen, track pad, track ball, isopoint, and/or a voice recognition system.

One or more displays, printers, and/or other output devices 214 may also be connected to the controller 202 via one or more of the interface circuits 210. The display 214 may be a cathode ray tube (CRT), a liquid crystal display (LCD), or any other type of display. The display 214 generates visual displays of data generated during operation of the client 102. The display 214 is typically used to display web pages received from the publication link server 104 and/or a web page server 106. The visual displays may include prompts for human operator input, run time statistics, calculated values, detected data, etc . . .

The client 102 may also exchange data with other devices via a connection to the network 108. The network connection may be of any type made over any connection modality, such as an Ethernet connection, a digital subscriber line (DSL), a telephone line, a coaxial cable, a wireless connection, etc . . . Users of the system 100 may be required to register with the publication link server 104. In such an instance, each user may choose a user identifier and a password which may be required for the activation of services. The user identifier and password may be passed across the Internet 108 using encryption built into the user's browser. Alternatively, the user identifier and/or password may be assigned by the publication link server 104.

Figure 3:
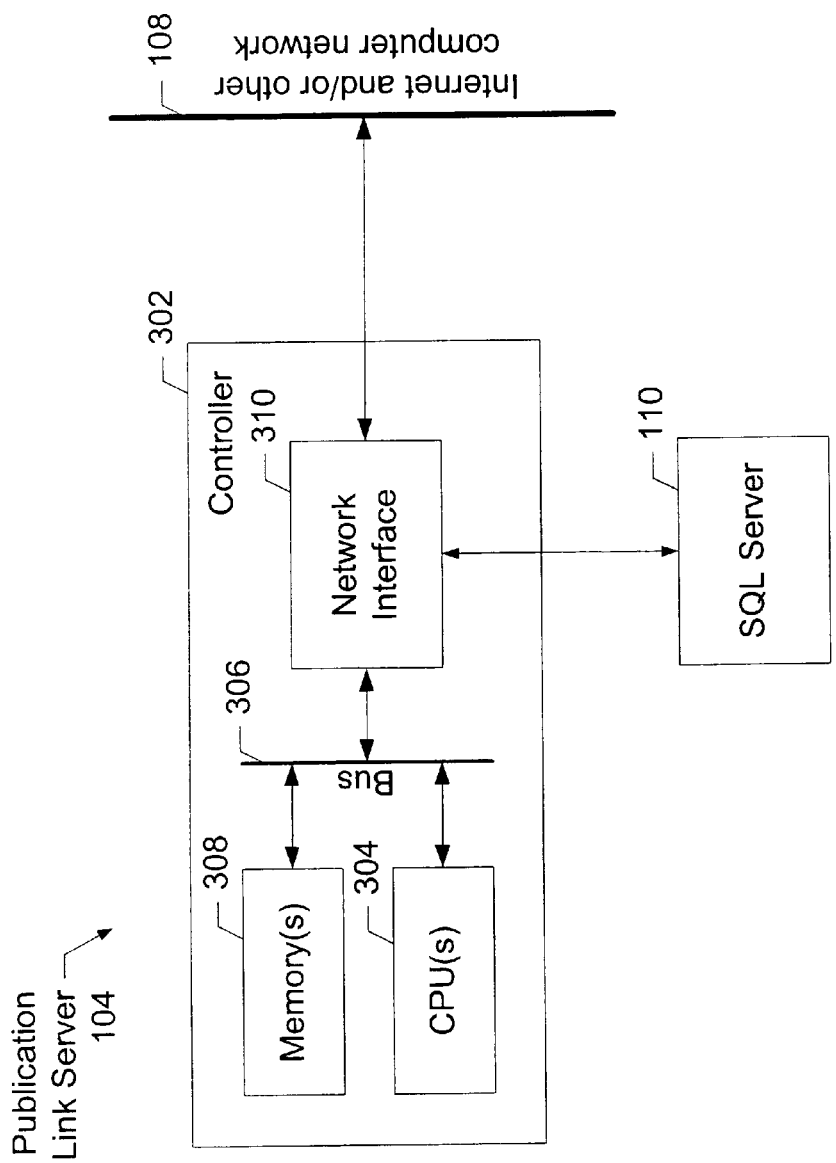
FIG. 3 is a more detailed block diagram showing one embodiment of the publication link server illustrated in FIG. 1.

A more detailed block diagram of a publication link server 104 is illustrated in FIG. 3. Like the client device 102, the controller 302 in the publication link server 104 preferably includes a central processing unit (CPU) 304 electrically coupled by an address/data bus 306 to a memory device 308 and a network interface circuit 310. However, the sever controller 302 is typically more powerful than the client controller 202. Again, the CPU 304 may be any type of well-known CPU, such as an Intel Pentium™ processor, and the memory device 308 preferably includes volatile memory and nonvolatile memory. Preferably, the memory device 308 stores a software program that implements all or part of the method described below. This program may be executed by the CPU 304 in a well-known manner. However, some of the steps described in the method below may be performed manually or without the use of the publication link server 104. The memory device 308 and/or the SQL server 110 also store files, programs, web pages, and other data for use by the client devices 102.

The publication link server 104 may exchange data with other devices via a connection to the network 108. The network interface circuit 310 may be implemented using any data transceiver, such as an Ethernet transceiver. The network 108 may be any type of network, such as a local area network (LAN), a wide area network (WAN), and/or the Internet.

Figure 4:
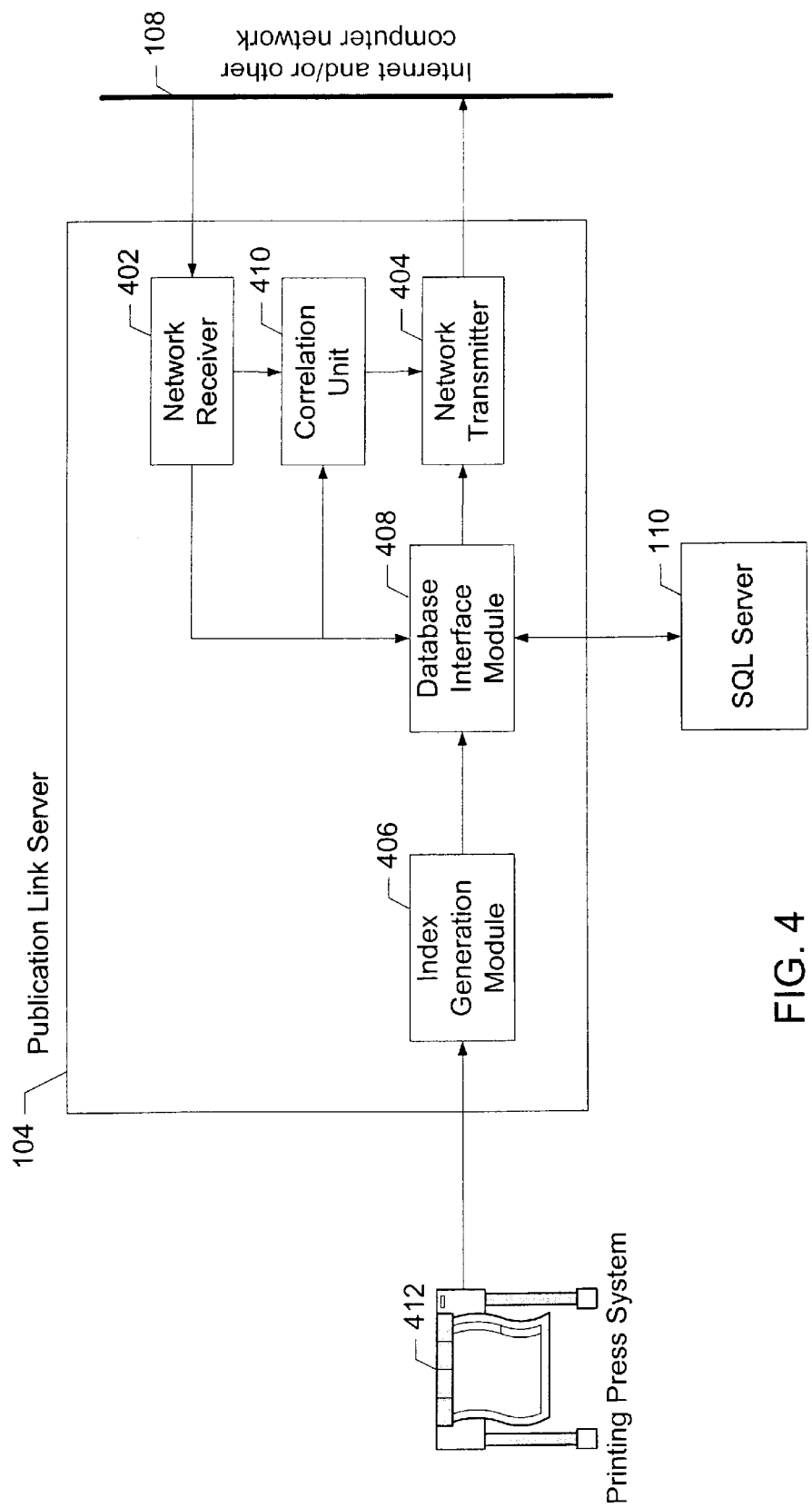
FIG. 4 is a more detailed block diagram showing another embodiment of the publication link server illustrated in FIG. 1.

A more detailed block diagram of another embodiment of the publication link server 104 is illustrated in FIG. 4. In this embodiment, the publication link server 104 includes a plurality of interconnected modules 402–410. Many of the modules may be implemented by a microprocessor executing software instructions and/or conventional electronic circuitry. In addition, a person of ordinary skill in the art will readily appreciate that certain modules may be combined or divided according to customary design constraints.

For the purpose of receiving web page requests, purchase requests, publication links, publication hit specifications, network addresses, page number links, user names, passwords, general search queries, publication specific queries (each preferably including a publication identifier and a search term), and other data, the publication link server 104 includes a network receiver 402. The network receiver 402 is operatively coupled to the network 108 in a well-known manner. For example, the network receiver 402 may be an Ethernet interface circuit electrically coupled to the Internet via an Ethernet cable.

For the purpose of transmitting data related to a "target" network address (i.e., the network address ultimately selected in response to a query) the publication link server 104 includes a network transmitter 404. The transmitted data may include one or more web pages, hyperlinks, redirection messages, digital publications, and/or other data, The network transmitter 404 is operatively coupled to the network 108 in a well-known manner. For example, the network transmitter 404 may also be an Ethernet interface circuit electrically coupled to the Internet via an Ethernet cable.

For the purpose of receiving print data 112 from a printing press system 412 (or any other source of print data 112) and generating a search index based on the print data 112, the publication link server 104 includes an index generation module 406. The index generation module 406 is operatively coupled to the printing press system 412. Preferably, the print data 112 are indicative of a printed publication generated by the printing press system 412. The search index facilitates searching of the print data 112. Of course, a person of ordinary skill in the art will readily appreciate that the index generation module 406 may be part of another computing device instead of the publication link server 104.

The indexing process undertaken by the index generation module 406 may be done in a well-known manner typically used to generate conventional printed book indices. For example, every word in a particular printed publication may be associated with every page number on which the word occurs. In addition, the order of the words may be preserved in the index to facilitate phrase searching. Alternatively, each of a number of preselected words and/or phrases may be logically associated with every page number on which the preselected words and/or phrases occur. Preselected words and/or phrases may be contained in a common data dictionary and/or preselected words and/or phrases may be designated electronically with one or more tags in the print data 112. If desired, some or all of the tags need not be printed in the printed publication (i.e., one or more of the tags may be "invisible" to the reader). In any event, the tags indicate to the index generation module 406 that a particular word or phrase should be included in the search index. In addition, if the tags are visible or cause a visual effect in the printed publication, the tags indicate to the reader that the visually highlighted word or phrase is included in the search index.

For the purpose of storing the search index and the publication links (including publication hit specifications and network addresses), the publication link server 104 includes a SQL server 110 and a database interface module 408. The database interface module 408 is operatively coupled to the index generation module 406 and the network receiver 402. The database interface module 408 receives the search index from the index generation module 406 and stores the search index in the SQL server 110. Similarly, the database interface module 408 receives the publication links from the network receiver 402 and stores the publication links in the SQL server 110.

Preferably, the publication links are transmitted to the publication link server 104 by the link administrators 107c and 107d (before, during, and/or after printing of the publication). Only link administrators authorized by the publisher have access to links associated with that publisher. For example, a particular user name and password may be required to submit publication links associating a particular publisher's publication hit specifications with network addresses. Each publication link may associate a word, a page, a chapter, a title, a publisher, and/or any other book identifying data with a network address.

A chapter link logically associates a group of pages, which are related by chapter in the printed publication, to a single network address. Preferably, chapter links are stored at a lower order of precedence than page number links. In other words, a page may be referenced in one link which is specific to that page and another link which is specific to the chapter the page is in. Preferably, the specific page link takes precedence over the chapter link. In this manner, a publisher can quickly assign all pages in a printed publication to some link and then go back and treat certain pages as special by assigning a specific page link. Similarly, a publication title link logically associates a group of pages, which are related by publication, to a single network address. Preferably, publication title links are stored at a lower order of precedence than chapter links. A publisher link logically associates a group of pages, which are related by publisher, to a single network address. Preferably, publisher links are stored at a lower order of precedence than publication title links.

For the purpose of determining a target network address, the publication link server 104 includes a correlation unit 410. The correlation unit 410 is operatively coupled to the network receiver 402, the SQL server 110, and the network transmitter 404. The correlation unit 410 receives a query from a client device 102 via the network receiver 402. Preferably, the query includes one or more search terms. Each search term may be a single word or a sequenced phrase (e.g., "salt water" AND "fishing for dummies") Alternatively, the publication query may include a publication identifier (e.g., book title="The Ultimate Salt Water Fishing Guide") and a search term (e.g., "Big Eye Tuna"). In addition, the publication query may include a publisher, a page number, a foreign language indicator, a search parameter restricting searching to publication links and/or other data. If included in the publication query, the foreign language indicator designates the language used in the publication query. In this manner, the publication query may be preprocessed (i.e., before the query is used to identify one or more page numbers) by a language translation step in a well-known manner.

Subsequently, the correlation unit 410 identifies one or more publication hit specifications using the search index portion of the SQL server 110 and the received query. For example, the search index may indicate that the phrase "Big Eye Tuna" appears in "The Ultimate Salt Water Fishing Guide" on page twenty-three. The correlation unit 410 then determines a target network address by looking up the indicated page number in the link database 110b. For example, page twenty-three of "The Ultimate Salt Water Fishing Guide" may be linked to www.SportFishWorld.com/Tuna.

Once the correlation unit 410 determines the target network address, the network transmitter 404 transmits data related to the target network address to the client device 102 via the network 108. The transmitted data may be a hyperlink, web page data, a redirection message, a digital version of a printed publication and/or other data. In the case of a hyperlink, the client device 102 receives the target address itself in a form in which the user may request content located on the network 108 at the target address by selecting the hyperlink (e.g., "Click here to retrieve www.SportFishWorld.com/Tuna"). In the case of web page data, the publication link server 104 retrieves the content from a web page server 106 located at the target address and sends the retrieved content to the client device 102 (e.g., the web page data located at www.SportFishWorld.com/Tuna is sent to the client). In the case of a redirection message, the publication link server 104 transmits the target address to the client device 102 along with a command to the client 102 to automatically retrieve the content from the web page server 106 located at the target address (e.g., Command: Go to www.SportFishWorld.com/Tuna without user intervention). In the case of a digital version of a printed publication, any of the above methods may be used (e.g., the client device may be sent a hyperlink to the digital version of a printed publication, and/or the client device may be sent a redirection message to the digital version of a printed publication). Alternatively, the digital publication and/or other content may be stored locally in the SQL server 110. In such an instance, the publication link server 104 preferably retrieves the digital publication and transmits the digital publication to the client 102 via the network 108 in a well-known manner.

Figure 5:
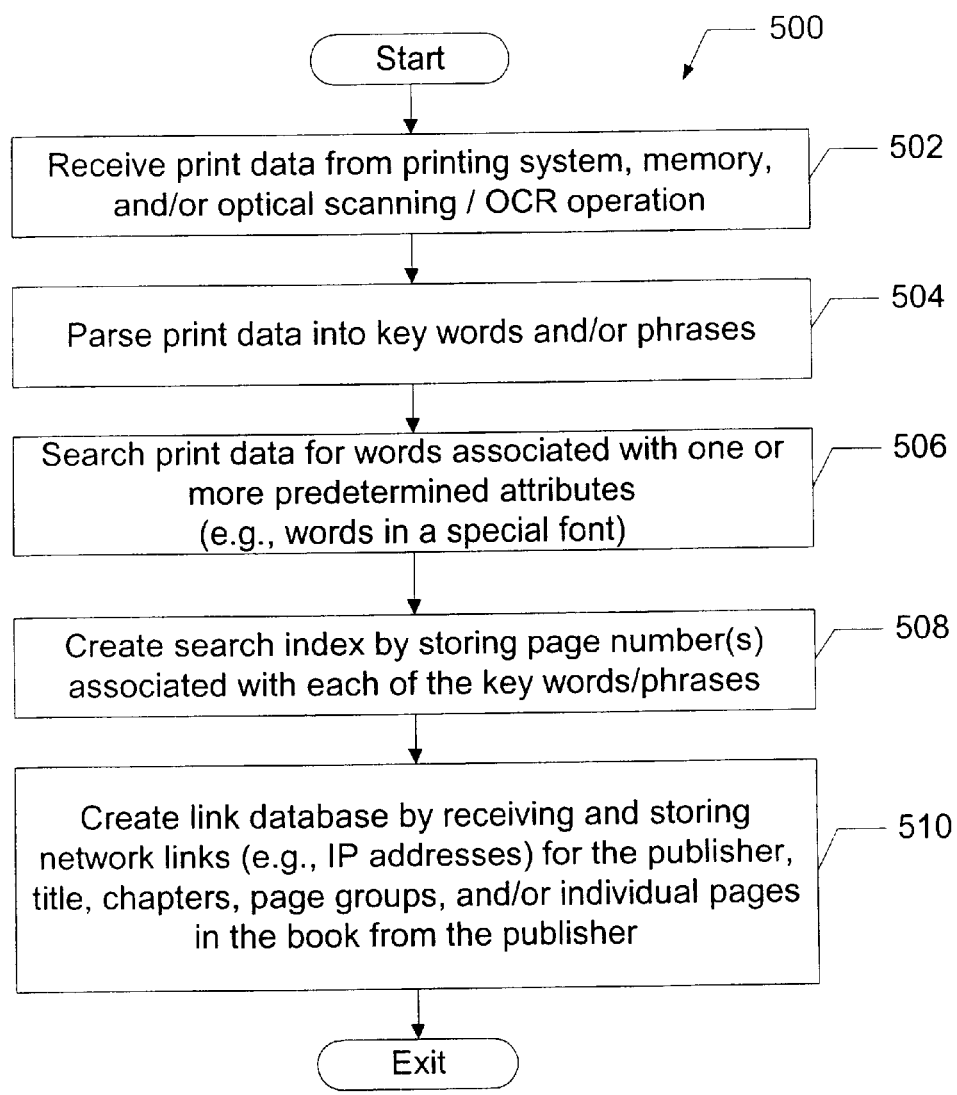
FIG. 5 is a flowchart of a program structured to cause a microprocessor embedded in the publication link server of FIG. 1 to create a search index and a link database.

A flowchart of a process 500 for creating a search index and a link database is illustrated in FIG. 5. Preferably, the process 500 is embodied in a software program which is stored in the publication link server memory 308 and executed by the server CPU 304 in a well-known manner. However, some or all of the steps of the process 500 may be performed manually and/or by another device. Although the process 500 is described with reference to the flowchart illustrated in FIG. 5, a person of ordinary skill in the art will readily appreciate that many other methods of performing the acts associated with process 500 may be used. For example, the order of many of the steps may be changed without departing from the scope or spirit of the present invention. In addition, many of the steps described below are optional.

Generally, the process 500 causes the publication link server CPU 304 to generate and store a search index and a link database. The search index is preferably based on print data 112 received from the publisher servers 107a and 107b, a printing process 412, a memory storing the print data 112, and/or an optical character recognition process 118. The link database is preferably based on publication hit specifications and associated network addresses received from an administrator authorized by the appropriate publisher.

The process 500 begins when a block 502 receives print data 112 indicative of a printed publication. Preferably, print data 112 includes coded text, such as ASCII characters. Once the print data 112 are received, a block 504 parses the print data 112 into key words and/or key phrases. Key words and key phrases may be determined based on any well-known indexing criteria. Preferably, all or nearly all the words in the print data 112 are indexed. However, the occurrence of certain predetermined keywords listed in a data dictionary may be selected or omitted. Similarly, frequently occurring words and/or phrases may be selected or omitted. In addition, a block 506 may search the print data 112 for words and/or phrases associated with a predetermined attribute such as a visual indicator and/or an embedded tag. For example, a predetermined font type (e.g., Arial, Courier, Times, etc . . . ), font style (e.g., italics, reverse italics, bold underlined, etc . . . ), and/or font size (e.g., 10 point, 12 point, etc . . . ) may be used to indicate that the associated phrase should be included in the search index.

A block 508 then creates at least a portion of the search index by storing each word/phrase in logical association with the page number(s) (an/or other book identifiers) where the word/phrase is found. The link database is then created when a block 510 stores a network address in logical association with each publication hit specification. Preferably, the network addresses and the associated publication hit specifications are received from the publisher servers 107a and 107b via the network 108. Once the search index and the link database are created, the publication link server 104 may begin directing clients 102 to web pages based on the printed publication.

Figure 6:
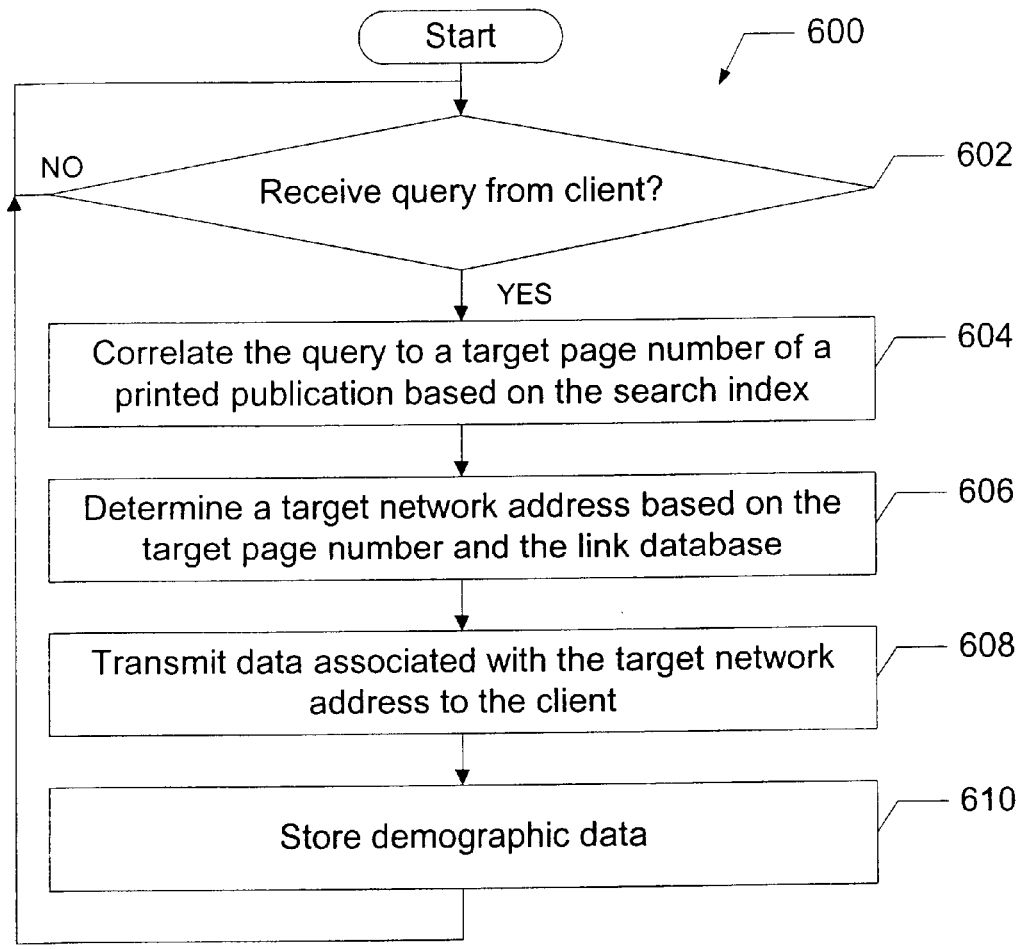
FIG. 6 is a flowchart of another program structured to cause a microprocessor embedded in the publication link server of FIG. 1 to direct a client device to a web page based on a printed publication.

A flowchart of a process 600 for directing clients 102 to web pages based on a printed publication is illustrated in FIG. 6. Preferably, the process 600 is embodied in a software program which is stored in the publication link server memory 308 and executed by the server CPU 304 in a well-known manner. However, some or all of the steps of the process 600 may be performed manually and/or by another device. Although the process 600 is described with reference to the flowchart illustrated in FIG. 6, a person of ordinary skill in the art will readily appreciate that many other methods of performing the acts associated with process 600 may be used. For example, the order of many of the steps may be changed without departing from the scope or spirit of the present invention. In addition, many of the steps described below are optional.

Generally, the process 600 causes the publication link server CPU 304 to determine a target network address based on a client query, the search index, and the link database. The target address is then used to send the client data. The process 600 begins when a block 602 receives a query from a client device 102. In one embodiment, the query is a text based query, such as the words "Big Eye Tuna" entered via a keyboard In another embodiment, the query is a graphics based query, such as a digital image taken by a digital camera. In such an embodiment, the graphics are preferably analyzed by a character recognition process to determine one or more words. This analysis may be performed by a client 102 and/or a server 104, 106.

A block 604 then correlates the query to one or more publication hit specifications using the search index. For example, the search index may indicate that the phrase "Big Eye Tuna" appears in "The Ultimate Salt Water Fishing Guide" on page twenty-three. A block 606 then determines a target network address by looking up the indicated publication hit specification in the link database 110b. For example, page twenty-three of "The Ultimate Salt Water Fishing Guide" may be linked to www.SportFishWorld.com/Tuna.

Once the block 606 determines the target network address, a block 608 transmits data related to the target network address to the client device 102 via the network transmitter 404 and the network 108. As noted above, the transmitted data may be a hyperlink, web page data, a redirection message, a digital version of a printed publication and/or other data as described in detail above. Subsequently, a block 610 may store demographic data associated with the transaction. For example, if the user's identity is known (e.g., via a cookie or a log-in process), the publication link server 104 may store the target address in association with data representative of the user's identity in the demographics database 110c. Subsequently, authorized users, such as publishers, may retrieve data stored in the demographics database 110c.

In summary, persons of ordinary skill in the art will readily appreciate that a method and apparatus for serving a web page to a client device based on a printed publication has been provided. Users of systems implementing the teachings of the present invention can enjoy narrow search results when seeking more information on the Internet related to printed information.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method of serving a web page to a client device, the method comprising the steps of:

receiving first print data from a first publisher, the first print data being indicative of a first printed publication;

receiving second print data from a second publisher, the second print data being indicative of a second printed publication, the first print data being different than the second print data, the first publisher being different than the second publisher;

generating a search index from the first print data and the second print data, the search index facilitating full-text searching of the first print data and the second print data;

receiving a first plurality of publication links from a first link administrator authorized by the first publisher, each of the first plurality of publication links associating each of a first plurality of publication hit specifications with each of a first plurality of network addresses, each of the first plurality of publication hit specifications identifying a portion of the first print data;

receiving a second plurality of publication links from a second link administrator authorized by the second publisher, each of the second plurality of publication links associating each of a second plurality of publication hit specifications with each of a second plurality of network addresses, each of the second plurality of publication hit specifications identifying a portion of the second print data;

the first plurality of publication links being different than the second plurality of publication links, the first link administrator lacking authorization to submit publication links associating a publication hit specification from the second plurality of publication hit specifications with any network address, the second link administrator lacking authorization to submit publication links associating a publication hit specification from the first plurality of publication hit specifications with any network address;

receiving a search query from the client device via a network;

correlating the query to at least one publication hit specification contained in the first plurality of publication hit specifications and the second plurality of publication hit specifications based on the search index;

determining a target network address contained in the first plurality of network addresses, the target network address being associated with the at least one publication hit specification by the first plurality of publication links; and transmitting data related to the target network address to the client device via the network.

2. A method as defined in claim 1, wherein the step of receiving a first plurality of publication links comprises the step of receiving a page link, the page link including a publication hit specification indicative a single page in the first printed publication, the page link associating the single page with a first network address.

3. A method as defined in claim 2, wherein the step of receiving a first plurality of publication links comprises the step of receiving a chapter link, the chapter link including a publication hit specification indicative of a group of pages related by a chapter in the first printed publication, the chapter link associating the group of pages with a second network address, the second network address being different than the first network address, the chapter link having a lower order of precedence than the page link.

4. A method as defined in claim 1, wherein the step of receiving a search query from the client device comprises the step of receiving a search parameter, the search parameter being indicative of a search restricted to the search index.

5. A method as defined in claim 1, further comprising a step of searching a web page index using the search query.

6. A method as defined in claim 4, wherein the step of receiving a search query from the client device comprises the step of receiving a digital image.

7. A method as defined in claim 4, wherein the step of receiving a search query from the client device comprises the step of receiving text derived from a digital image.

8. A method as defined in claim 4, wherein the step of receiving a search query from the client device comprises the step of receiving a publication identifier.

9. A method as defined in claim 1, wherein the step of transmitting data related to the target network address comprises the step of transmitting a redirection message.

10. A method as defined in claim 1, wherein the step of transmitting data related to the target network address comprises the step of transmitting web page data.

11. A method as defined in claim 1, wherein the step of transmitting data related to the target network address comprises the step of transmitting hyperlink data.

12. A method as defined in claim 1, further comprising the step of storing demographic information associated with the search query.

13. A method of serving a web page to a client device based on a printed publication, the method comprising the steps of:
  generating a search index from print data, the print data being indicative of the printed publication, the search index associating a plurality of words in the printed publication with a plurality of page numbers on which the plurality of words occur in the printed publication;
  receiving a plurality of page number links from an authorized publisher, each page number link associating a particular page in the printed publication with a network address;
  receiving a publication query from the client device via a network, the publication query including a publication identifier and a search term;
  correlating the publication query to a target page number of the printed publication based on the search index;
  retrieving a target network address from the plurality of page number links based on the target page number; and
  transmitting data related to the target network address to the client device via the network.

14. A method as defined in claim 13, wherein the step of generating a search index from print data comprises the step of generating the search index from the print data during a printing process associated with the printed publication.

15. A method as defined in claim 13, wherein the step of generating a search index from print data comprises the steps of:
  optically scanning the printed publication to produce a plurality of digitized pages; and
  performing a character recognition process on the digitized pages.

16. A method as defined in claim 13, wherein the step of generating a search index from print data comprises the step of selecting a word to include in the plurality of words based on a visual indicator associated with the word.

17. A method as defined in claim 16, wherein the step of selecting a word to include in the plurality of words comprises the step of selecting the word based on at least one of a font type, a font style, and a font size associated with the word.

18. A method as defined in claim 16, wherein the step of selecting a word to include in the plurality of words comprises the step of selecting the word based on a graphic indicator associated with the word.

19. A method as defined in claim 18, wherein the step of selecting the word based on a graphic indicator associated with the word comprises the step of selecting the word based on at least one of an icon and a border associated with the word.

20. A method as defined in claim 13, wherein the step of storing a plurality of page number links comprises the step of storing a chapter link, the chapter link being indicative a group of pages related by a chapter in the printed publication.

21. A method as defined in claim 20, wherein the step of storing a chapter link comprises the step of storing the chapter link at a lower order of precedence than a specific page number link referencing a page in the chapter.

22. A method as defined in claim 21, wherein the step of storing a plurality of page number links comprises the step of storing a publication title link, the publication title link being indicative of all the pages in the printed publication, the publication title link being stored at a lower order of precedence than the chapter link.

23. A method as defined in claim 22, wherein the step of storing a plurality of page number links comprises the step of storing a publisher link, the publisher link being indicative of all the pages in the printed publication and all the pages in a second printed publication, the publisher link being stored at a lower order of precedence than the publication title link.

24. A method as defined in claim 13, wherein the step of storing a plurality of page number links comprises the step of associating the particular page in the printed publication with an Internet address.

25. A method as defined in claim 13, wherein the step of receiving a publication query from the client device comprises the step of receiving at least one of a publication title, a page number, a registered phrase, and a foreign language indicator.

26. A method as defined in claim 13, wherein the step of receiving a publication query from the client device comprises the step of receiving voice inputs entered at the client device.

27. A method as defined in claim 13, wherein the step of receiving a publication query from the client device via a network comprises the step of receiving the publication query from the client device via the Internet.

28. A method as defined in claim 13, wherein the step of transmitting data related to the target network address comprises the step of transmitting at least one of a redirection message, web page data, and hyperlink data.

29. A method as defined in claim 13, wherein the step of transmitting data related to the target network address comprises the step of transmitting a digital version of a second printed publication.

30. A method as defined in claim 13, further comprising the step of storing demographic information associated with the publication query.

31. An apparatus for serving a web page to a client device based on a printed publication, the apparatus comprising:
- a memory device storing (i) a search index generated from print data used during a printing process associated with the printed publication, and including information linking various parts of the printed publication the print data being indicative of the printed publication, and (ii) a plurality of links, each link associating an index entry from the search index with a network address;
- a network receiver structured to receive a query from the client device via a network;
- a network transmitter structured to transmit data related to a target network address to the client device via the network; and
- a controller operatively coupled to the memory device, the network receiver, and the network transmitter, the controller being structured to correlate the query to the target network address based on the search index and the plurality of links, the controller being structured to cause the network transmitter to transmit the data related to the network address to the client device via the network in response to the query.

32. An apparatus as defined in claim 31, further comprising an optical scanner structured to convert the printed publication into a bit map and an optical character recognition system structured to convert the bit map into the print data.

33. An apparatus as defined in claim 31, wherein the controller is further structured to detect a predefined visual indicator associated with a word in the print data, the controller being further structured to store the word associated with the predefined visual indicator in the memory device as part of the search index.

34. An apparatus as defined in claim 33, wherein the controller is further structured to detect at least one of a predefined font type, a predefined font style, a predefined font size, a predefined icon, and a predefined border.

35. An apparatus as defined in claim 31, wherein the search index stored in the memory device comprises a plurality of page number links, each page number link associating a particular page in the printed publication with a particular network address.

36. An apparatus as defined in claim 35, wherein the search index stored in the memory device comprises a chapter link, the chapter link being indicative of a group of pages related by a chapter in the printed publication, the chapter link being stored at a lower order of precedence than a specific page number link referencing a page in the chapter.

37. An apparatus as defined in claim 31, wherein the data related to the network address comprises at least one of a redirection message, a web page, and a hyperlink.

38. An apparatus as defined in claim 31, wherein the data related to the network address comprises a digital version of a second printed publication.

39. An apparatus for serving a web page associated with a printed publication to a client device via a network, the apparatus comprising:
- a printing press system;
- an index generation module operatively coupled to the printing press system, the index generation module being structured to receive print data from the printing press system, the print data being indicative of the printed publication, the index generation module being structured to generate a search index using the print data, the search index associating a plurality of words in the printed publication with a plurality of page numbers on which the plurality of words occur in the printed publication;
- a link database, the link database holding a plurality of page number links, each page number link associating a particular page in the printed publication with a network address;
- a network receiver operatively coupled to the network, the network receiver being structured to receive a publication query;
- a correlation unit operatively coupled to the network receiver and the link database, the correlation unit being structured to determine a target page number of the printed publication based on the search index and the publication query, the correlation unit being structured to retrieve a target network address from the link database based on the target page number; and
- a network transmitter operatively coupled to the network and the correlation unit, the network transmitter being structured to transmit data related to the target network address to the client device via the network.

40. An apparatus as defined in claim 39, wherein the index generation module is further structured to determine the plurality of words based on a tag associated with the plurality of words, the tag being included in the print data received from the printing press system.

* * * * *